Patented Feb. 13, 1940

2,190,167

UNITED STATES PATENT OFFICE 2,190,167

PROCESS FOR PRODUCTION OF ASCORBIC ACID

Otto Zima, Darmstadt, Germany, assignor to Merck & Co. Inc., Rahway, N. J., a corporation of New Jersey No Drawing. Application January 12, 1937, Serial No. 120,291. In Germany January 14, 1936

6 Claims. (Cl. 260—344)

This is a continuation-in-part of application Serial No. 111,711, filed November 19, 1936.

In the above-identified application, there is disclosed a process for producing ascorbic acid directly from diacetone-keto-l-gulonic acid which comprises essentially treating the latter with concentrated hydrochloric acid.

I have now found that, in addition, other methylene ether derivatives of 2-keto-l-gulonic acid, this acid itself, as well as its lower aliphatic alcohol esters may likewise be treated with concentrated hydrochloric acid for the production of pure ascorbic acid in substantial yield.

Such reactions involving the use of diluted hydrochloric acid have been known previously, and a pH range of 0.3–3.4 (which corresponds to 0.0004–0.5 $n$/HCl) has been stated to be particularly favorable for such processes. However, such poor yields are obtained by these methods that they have not found application in actual commercial practice. For example, the yields thus obtained compare very unfavorably with the yields obtained by other known processes for producing this acid, such as, for instance, the known process which comprises treating the methyl ester of keto-gulonic acid with alkaline reagents.

In view of the known sensitivity of ascorbic acid to hydrochloric acid, it is surprising to find that by working with concentrated acid instead of dilute acid, the described processes of converting methylene ether derivatives of 2-keto-l-gulonic acid, the acid itself, or its lower aliphatic alcohol esters into ascorbic acid can be modified so that the yield of 20–30% of theory obtained when working with dilute acid, may be raised to more than 80% of theory when concentrated acid is employed. This may be explained, perhaps, by the fact that, as has been established by the present workers, when keto-gulonic acid or its indicated derivatives are mixed with concentrated hydrochloric acid, there apparently is formed a compound having different properties, i. e., increased water solubility, which evidently is not formed with the diluted acid.

I have found that the effect of concentrated hydrochloric acid upon keto-gulonic acid and its indicated derivatives is analogous to the effect of the concentrated acid upon diacetone-keto-gulonic acid as disclosed in the pending application above identified.

In carrying out the instant process, the following facts have also been developed:

1. The yield of ascorbic acid increases with the concentration of the hydrochloric acid employed, if the other conditions, such as the quantity of acid used, the temperature, and the time of reaction are adjusted to their most favorable values. Thus, it is advantageous to replace the hydrochloric acid lost during heating by constantly adding hydrochloric acid to the reaction liquid, or by working in a closed vessel, i. e., under pressure.

2. When the temperature is varied within practically applicable limits, no material changes in the yields obtained are noted, but the time required for the yield to reach its optimum point will vary considerably.

3. In intermittently checking up on the course of the reaction process, by taking samples and titrating them for ascorbic acid, it is noted that, within the given conditions, the titratable ascorbic acid increases to a certain maximum yield, and then again decreases more slowly. For example, in treating the methyl ester of keto-gulonic acid with HCl of specific weight 1.19 at room temperature, the most favorable yield (85% of theory) is obtained after 5 days, under certain test conditions, whereupon the amount of titratable ascorbic acid in the reaction mixtures decreases slowly. At 60°, under test conditions otherwise the same, the point of maximum ascorbic acid formation is reached after only about one hour. By raising the temperature still higher, considerably shorter periods of reaction are required.

Similar results are also obtained with keto-l-gulonic acid itself, and its other indicated derivatives. For example, a yield of ascorbic acid equal to 85% of theory is obtained by treating keto-l-gulonic acid with 10 parts of hydrochloric acid (specific weight 1.19) at 60° for 2½ hours.

For technical purposes, temperatures below room temperature will be found to require too much time, whereas at temperatures above 100°, the work would have to be done so quickly that it would require special apparatus and especially careful control. The most satisfactory time of reaction, has been found to lie between temperatures of 40–60° C., and these are, therefore, preferable.

4. The quantity of acid used in proportion to the quantity of keto-gulonic acid or its derivatives, is not without influence upon the course of the reaction. Thus, it has been found better to use 10 parts of HCl to one part of keto-gulonic acid or its chosen derivative, than to use equal parts.

From the foregoing, it will be evident that for every initial batch of material, the most favorable duration of the reaction must first be determined by titration of samples currently taken out. Under exactly the same conditions, the reaction of other batches can then be discontinued at the most favorable time thus determined.

The finishing up of the reaction solution to pure ascorbic acid may be accomplished by methods conventionally employed for the special objects to be attained. For example, the dark-colored reaction solution may be cleared by treatment with animal charcoal, and the hydrochloric acid may then be evaporated and the residue recrystallized from water.

Because of the sensitivity of ascorbic acid to hydrochloric acid, the evaporation of the acid should preferably be carried out at low temperature, under vacuum. Of course, the hydrochloric acid can also be neutralized, but this involves the inconvenience of having to separate the ascorbic acid from salts.

*Examples*

1. About 1 part of keto gulonic acid methyl ester is mixed with about 10 parts of HCl and left standing at 25°. Every day a sample is taken from the solution and titrated at acidic reaction with $n/10$ iodine solution. After about 5-7 days ascorbic acid in a quantity equal to 85-90% of theory is formed. The dark-colored solution is then poured over 3 parts of ice, filtered over animal charcoal, and evaporated in vacuo to crystallization. The crystallized residue is washed with alcohol. Water is thereupon added to the wash-alcohol, and the water-alcohol solution is concentrated in vacuo to remove the alcohol. The washing alcohol is combined with the mother liquor of the first crystallization, diluted with water, and again treated with animal charcoal. By concentration in vacuo, a second crystallization is obtained which is treated in the same manner. A third crystallization can be obtained from the mother liquors.

Even after only one recrystallization, a yield of pure ascorbic acid amounting to 75% of theory is obtained.

2. About 1 part of keto gulonic acid methyl ester is heated with about 20 parts of HCl (specific weigth 1.19) to 60°. The reaction is terminated after about one hour, the reaction optimum having been determined by titration. The further finishing up is in accordance with the process described in Example 1. A yield of ascorbic acid equal to 70-80% of theory is obtained.

The reaction is not greatly affected by changing the quantity of HCl employed; good yields are also obtained with 5 parts of HCl to 1 part of keto gulonic acid methyl ester.

The reaction can be materially accelerated by constantly adding HCl gas to the solution, in order to maintain the high concentration of the acid as far as possible, but the yield of acid will only be slightly augmented.

3. A mixture of about 1 part of keto gulonic acid methyl ester and about 10 parts of concentrated HCl ($s=1.19$) is kept at 60° in a closed vessel. After only about one hour, a yield of ascorbic acid equal to about 90% of theory is obtained. After still another hour, this yield has not noticeably decreased.

4. About 1 part of keto gulonic acid and 10 parts of concentrated HCl (specific weight 1.19) are heated to 60°. After from 2 to 2½ hours, the optimum yield of ascorbic acid is attained, this optimum point having been determined by titration. By finishing up the process in accordance with the process of Example 1, a yield of ascorbic acid equal to 75% of theory is obtained.

If the reaction is carried out at 40°, it is interrupted after about 24 hours.

5. 1 part of diformal-2-keto-1-gulonic acid is heated with 10 parts of HCl conc. $s=1.19$ at a temperature of 60-70° until in a sample the maximum of the iodine-reduction-value is reached, respectively is surpassed, which will happen after about 1½ hours. The solution is immediately poured in ice, filtered over charcoal and concentrated as quickly as possible at a low temperature. A yield of ascorbic acid purified by recrystallisation equal to 50-60% of theory is obtained.

6. 1 part of dibenzal-2-keto-1-gulonic acid is treated in the same way as in Example 5. The maximum of the reduction-value is reached after about 1 hour. A yield of pure ascorbic acid equal to 60-70% of the theory is obtained.

7. 1 part of diacetone-2-keto-1-gulonic acid-ethyl-ester and 0.5 part HCl conc. $s=1.19$ are heated at 60° until the maximum of the iodine-reduction-value is reached. By cooling immediately, the greatest part of the ascorbic acid will crystallise. By concentrating the mother-lye, further quantities of this acid are to be produced.

A yield of pure ascorbic acid equal to 70-75% of the theory is obtained.

I claim as my invention:

1. A process for the production of ascorbic acid which comprises treating a compound of the group consisting of 2-keto-gulonic acid, its methylene ether derivatives and its lower aliphatic alcohol esters with strongly concentrated hydrochloric acid.

2. A process for the production of ascorbic acid which comprises treating a compound of the group consisting of 2-keto-gulonic acid, its methylene ether derivatives and its lower aliphatic alcohol esters with hydrochloric acid of substantially specific gravity 1.19.

3. A step in the process for producing ascorbic acid from a compound of the group consisting of keto-gulonic acid, its methylene ether derivatives and its lower aliphatic alcohol esters by treating the same with strongly concentrated hydrochloric acid at elevated temperatures which comprises continuously conducting hydrochloric acid gas into the reaction liquid.

4. The process for the manufacture of laevo-ascorbic-acid which consists in heating esters of the bismethylene ethers of 2-keto-laevo-gulonic acid with concentrated hydrochloric acid.

5. The process for the manufacture of laevo-ascorbic acid which consists in heating diformal-2-keto-1-gulonic acid with concentrated hydrochloric acid.

6. The process for the manufacture of laevo-ascorbic acid which consists in heating dibenzal-2-keto-1-gulonic acid with concentrated hydrochloric acid.

OTTO ZIMA.